United States Patent [19]

Gorbacheva et al.

[11] Patent Number: 4,486,347
[45] Date of Patent: Dec. 4, 1984

[54] FLAME RETARDING ANTIMICROBIAL HALOGENATED AZO DYESTUFFS

[75] Inventors: Irina N. Gorbacheva; Ljudmila M. Sukhova; Zinaida J. Kozinda; Vladislav L. Molokov, all of Moscow; Lev T. Antonov; Vadim D. Simonov, both of Ufa; Viktor A. Chertov, Moscow; Semen I. Dvoskin, Moscow; Raisa S. Veseneva, Moscow, all of U.S.S.R.

[73] Assignee: Tsentralny Nauchnoissledovatelsky Institut Shersti, U.S.S.R.

[21] Appl. No.: 341,770

[22] Filed: Jan. 22, 1982

Related U.S. Application Data

[63] Continuation of Ser. No. 196,557, filed as PCT SU 79/00056 Jul. 13, 1979, published as WO80/00570, Apr. 3, 1980, § 102(c) dated May 18, 1980, abandoned.

[30] Foreign Application Priority Data

Sep. 18, 1978 [SU] U.S.S.R. ............... 2664359

[51] Int. Cl.³ .................. C09B 29/036; C09B 31/14; C09B 29/095; C09B 29/30
[52] U.S. Cl. .................. 534/797; 57/904; 252/8.6; 252/8.7; 252/8.75; 252/8.8; 424/226; 534/781; 534/784; 534/800; 534/839; 534/845; 534/884
[58] Field of Search ............... 260/152, 160, 157, 162, 260/163, 196, 197, 198, 200, 205; 8/490

[56] References Cited

U.S. PATENT DOCUMENTS

| | | | |
|---|---|---|---|
| 786,767 | 4/1905 | Julius et al. | 260/200 |
| 787,768 | 4/1905 | Julius et al. | 260/200 |
| 830,312 | 9/1906 | Ernst | 260/200 |
| 1,771,767 | 7/1930 | Bonhote | 260/163 |
| 1,878,698 | 9/1932 | Hentrich et al. | 260/200 |
| 3,995,995 | 12/1976 | Nickel | 260/196 X |
| 4,045,425 | 8/1977 | Hunter | 260/163 |

FOREIGN PATENT DOCUMENTS

| | | | |
|---|---|---|---|
| 1246743 | 10/1960 | France | 260/153 |
| 586736 | 4/1977 | Switzerland | 260/198 |
| 1537335 | 12/1978 | United Kingdom | 260/204 |

OTHER PUBLICATIONS

Colour Index, 2nd Edition, vol. 4, p. 7216, #52647 (1956).
Segal et al., "Textile Research Journal, vol. 44, pp. 839 to 844 (1974).

Primary Examiner—Floyd D. Higel
Attorney, Agent, or Firm—Steinberg & Raskin

[57] ABSTRACT

The halogenated azo dyestuffs of the present invention possess fire-proofing and antimicrobial properties and have the following general formula:

A—N=N—B

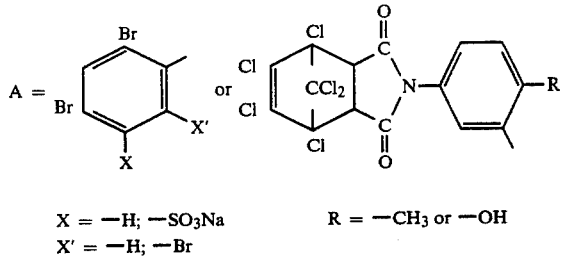

$X = -H; -SO_3Na$
$X' = -H; -Br$ $R = -CH_3$ or $-OH$

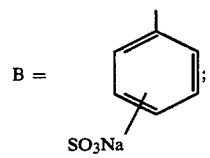

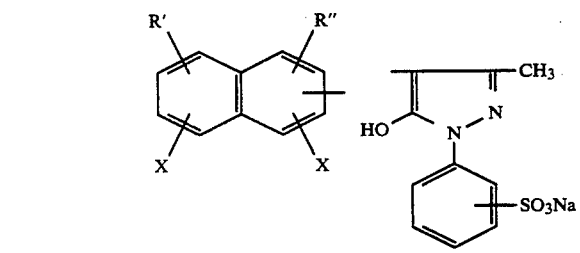

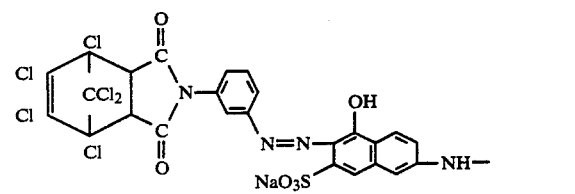

$R = -CH_3; -OH;$ $R' = -H; -OH; -NH-\phantom{x}$;

$R'' = -H; -NH_2; -SO_3Na;$
$X = -H; -SO_3Na.$

6 Claims, No Drawings

FLAME RETARDING ANTIMICROBIAL HALOGENATED AZO DYESTUFFS

This is a continuation of application Ser. No. 196,557, filed as PCT SU 79/00056 Jul. 13, 1979, published as WO 80/00570 Apr. 3, 1980, § 102(e) dated May 18, 1980 now abandoned.

FIELD OF THE INVENTION

The present invention relates to the art of azo dyestuffs and, more specifically, to halogenated azo dyestuffs possessing flame-resistant and antimicrobial properties.

BACKGROUND OF THE INVENTION

Substances and compositions pertaining to different classes of chemical compounds which impart flame-resistant and antimicrobial properties to fibrous materials are known in the art. This is effected by impregnation of these materials with aqueous solutions of said compounds or their solutions in organic solvents.

The fibrous materials can be also treated by dispersions of biologically active and fire-proofing compositions (cf. Japanese Pat. No. 41476, published 1968).

As the biologically active components use can be made of:

(1) salts of metals and organometallic compounds such as salts of zinc e.g. chloride, sulphate, acetate and the like (cf. U.S. Pat. No. 3,079,213 published 1963; British Pat. No. 916,665 published 1963; French Pat. No. 1,223,061 published 1960);

(2) derivatives of phenols and salicylic acid such as pentachlorophenol (cf. U.S. Pat. No. 2,698,301 published 1954; U.S. Pat. No. 3,346,575 published 1965); hexachlorophene with different substituents (cf. U.S. Pat. No. 2,359,986 published 1951, U.S. Pat. No. 2,574,319 published 1951); salicylic acid amides (cf. British Pat. No. 955,925 published 1964);

(3) salts of quaternary ammonium bases of a different structure such as laurylpyridinium chloride, methylpyridinium chloride and the like (cf. D. Galjardi, Am. Dyestuff Reporter, vol. 51, 2, February 1962, p. 31);

(4) organic compounds having a complex chemical composition such as antibiotics, dyestuffs (N. A. Krasil'nikov, R. A. Zhukov, B. B. Yashin, Microbiologija 29, 3, 446 (1960); French Pat. No. 1,182,455 published 1958; USSR Inventor's Certificate No. 273,353. Int. Cl. C 09 b 57/00, 22a 2, published 1968 and No. 401,169, Int. Cl. C 09 b 39/00, published 1973).

The effect of flame-resistance imparted to textile materials (wool and cellulose fabrics) is ensured through the treatment thereof with different organic and inorganic compounds of, for example, phosphorus, titanium, zirconium, halogen-containing phenol derivatives and the like.

The data relative to the improvement of flame-resistance of fibrous protein materials are more scarce than those relative to cellulose.

Processes for imparting flame-resistant properties to wool fabrics are known which comprise treatment thereof with phosphorus-containing compounds (Textil praxis No. 4, April 1972 (Stuttgart), Dr. U. Einsele "Über die Flamefestausrüstung VOu Textilien"), for example, with a composition of phosphoric acid with urea or a mixture of tetrakis hydroxymethylphosphonium chloride of the formula:

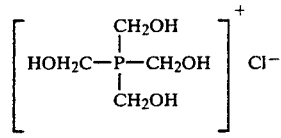

with melamine ("Proban" process), followed by drying and heat-treatment. With the use of the composition based on phosphoric acid, the effect of flame-resistance is not retained after laundering and, furthermore, the fabric colour is frequently varied. In the case of application of a mixture of phosphorus-containing compounds with melamine the touch of wool fabrics is impaired, they become rigid. The "Proban" process is also complicated as regards the technology and equipment employed.

For fire-proofing treatment use is also made of potassium fluorozirconate in acidic medium; however, since for these purposes high concentrations of the agent are required (at least 10% by weight of the fabric), this method of treatment is economically inefficient. Furthermore, the preparation cannot be used for half-wool fabrics with inclusion of synthetic fibres melting at a temperature approaching 100° C.

As it is known from the literature, one of the most effective processes for imparting flame-resistance to wool fibre resides in the treatment with chlorendic anhydride in the presence of dimethylformamide (Textile Colorist, No. 5, May, 1973; R. Whitfield, W. Frudman "Chemical Modification of Wool with Chlorendic Anhydride and Related Chloro-Organic Acid Anhydrides", pp. 76–78).

However, the use of this fire-proofing component makes the process unsuitable for commercial implementation, since it is incompatible with conventional finishing operations, and necessitates the use of sophisticated equipment adapted for operation with solvents. Also known in the art is a method for fire-proofing treatment by chlorendic acid after the process of dyeing at a pH of the solution of 2–3 (Textile Research Journal No. 7, June 1974, M. Friedman, J. F. Ash W. Fong "Dyebath Application of Chlorendic Acid for Flame-Resistant Wool", pp. 555–556).

The conditions of such treatment necessary for the use of such flame-resistant preparation and the subsequent carrying-out of two processes (dyeing and fire-proofing) causes weakening of the fibrous material and complication of the process scheme.

In the paper by L. Segal et al. (Textile Research Journal, vol. 44, No. 10, November 1974, New Orleans, La. S.A., and L. Segal et. al. "The Effect of Dyes on the Flammability of Cotton Fabric", p. 839) there are shown the data illustrating the effect of acid dyestuffs on aminized cotton. It is also shown that the decrease in flammability is observed for the majority of the tested acidic dyestuffs.

In the literature there is lack of data on simultaneously imparting flame-resistance and bio-resistance properties to textile materials by dyeing the material with special dyestuffs. There is indication of the opportunity of simultaneous imparting of flame-resistance and bio-protection properties to cellulose by way of treating with chloro-N-dimethylformiminium chloride (cf. U.S. Pat. No. 3,884,631 published 1975).

SUMMARY OF THE INVENTION

The present invention is directed to the provision of halogenated azo dyestuffs which impart flame-resistant and antimicrobial properties to protein fibrous materials simultaneously with dyeing.

The compounds according to the present invention have not been hitherto described in the literature.

The object of the present invention is accomplished by azo dyestuffs of the general formula:

A—N=N—B

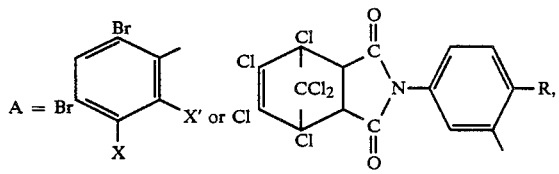

wherein:
X = —H or —SO₃Na;
X' = —H or —Br;
R = —CH₃ or —OH;

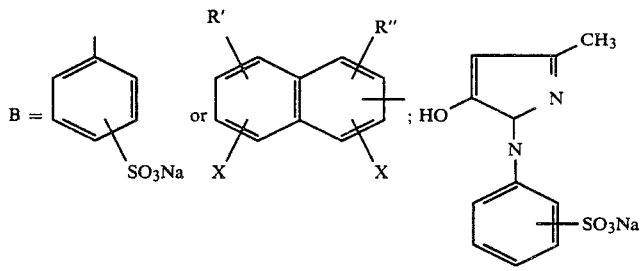

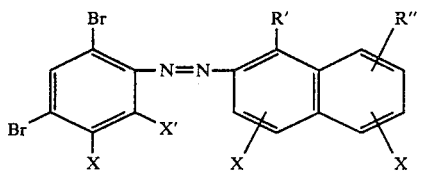

wherein:
X = —H; —SO₃Na;
X' = —H; —Br;

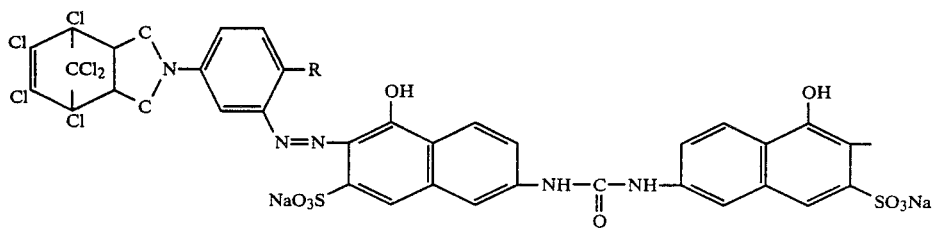

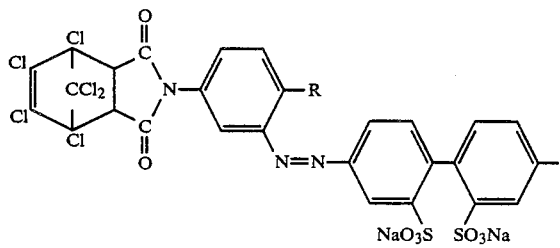

R = —CH₃ or —OH;

R' = —H or —OH or —NH—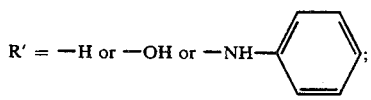;

R" = —H; —NH₂; —SO₃Na;
X = —H; —SO₃Na, possessing flame-resistant and antimicrobial properties.
Especially promising are the following azo dyestuffs:

R' = —H; —OH; —NH—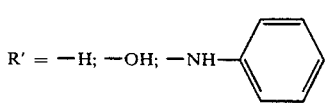

-continued

R″ = —H; —NH₂; —SO₃Na;

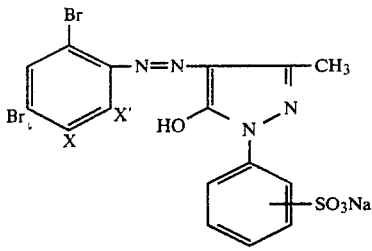

wherein
X = —H; —SO₃Na;
X' = —H; —Br.

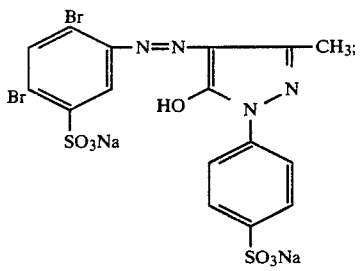

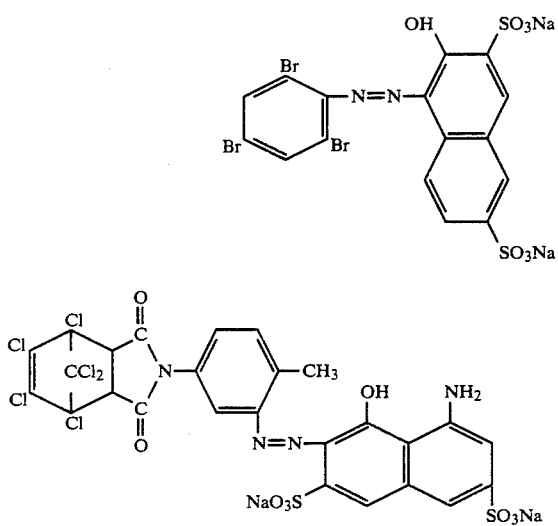

The halogenated azo dyestuffs according to the present invention impart flame-resistant and antimicrobial properties to fibrous protein materials simultaneously with dyeing thereof.

Furthermore, the use of the azo dyestuffs according to the present invention makes it possible to:

1. Substantially simplify the procedure of finishing of fibrous materials due to combination of the process of dyeing with special treatment operations.
2. Retain the fabric touch.
3. Ensure the effect of flame-resistance simultaneously with dyeing without changing the fabric weight.
4. Retain the effect of flame-resistance and antimicrobial properties over the entire period of use of the fibrous material.

BEST MODE FOR CARRYING-OUT THE INVENTION

The synthesis of azo dyestuffs according to the present invention is effected by diazotization of N-(4'-methyl-5'-aminophenyl)-1,4,5,6,7,7-hexachlorobicyclo-(2,2,1)-5-heptene-2,3-dicarboxyimide, 4-aminobenzenesulphonic acid, benzidinedisulphonic acid, 2,4,6-tribromoaniline, 2,4-dibromometanilic acid or 2,4,6-tribromometanilic acid, followed by azo coupling with sulphophenylmethylpyrazolone-5 or naphthalene derivatives having, as substituents, hydroxy, amino, phenylamino and sulphogroups in different positions of the aromatic ring.

The thus-prepared dyestuffs are employed for dyeing of protein fibrous materials. The dyeing of the latter is effected from aqueous solutions of the dyestuffs according to the present invention added with Glauber's salt, acetic acid which are introduced in the beginning of the dyeing process, followed by the addition of sulphuric acid by the end of dyeing. The dyed wool specimen kept under standard conditions at a moisture content of 65% is tested for flame-resistance by the vertical method using an open inflammation source. The burning time is determined along with glowing time and maximum length of the carbonized area after the removal of the inflammation source.

The antimicrobial properties of the fabrics dyed with the dyestuffs, with respect to their fungicidal resistance, are determined according to the IEC recommendations.

The dyeing fastness to various physico-chemical factors is assessed in points in comparison with standard shade scale.

EXAMPLE 1

(a) Into a four-neck flask provided with a stirrer, thermometer and a reflux condenser there are charged 150 ml of toluene, 37.1 g of chlorendic anhydride and heated to a temperature of from 90° to 95° C. under stirring. Then 12.2 g of 2,4-diaminotoluene are added and the flask contents are kept at this temperature for one hour, then cooled to a temperature of 20° C., filtered-off and dried.

There are obtained 36 g of a colourless crystalline product, i.e. N-(4'-methyl-5'-aminophenyl)-1,4,5,6,7,7-hexachlorobicyclo-(2,2,1)-5-heptene-2,3-dicarboxyimide melting at 265°–269° C. The yield is 76%; purity 90%. The product purity is determined by the TLC-chromatographic method. The structure of the purified product is justified by IR-spectroscopy and NMR-analysis of $^{13}C$.

(b) 2.84 g of N-(4'-methyl-5'-aminophenyl)-1,4,5,6,7,7-hexachlorobicyclo-(2,2,1)-5-heptene-2,3-dicarboxyimide are rubbed with 1.6 ml of concentrated hydrochloric acid; the thus-prepared paste is diluted with 30 ml of water and, under effective agitation and temperature of 5° C., a solution of 0.42 g of sodium nitrite in 2.5 ml of water. The reaction mixture is agitated for 30 minutes. The resulting slurry of the diazo compound is added, over 20–25 minutes, to a solution of 2.0 g of disodium 1-hydroxy-8-aminonaphthalene3,6-disulphonate in 20 ml of water containing 1.4 g of soda.

The reaction mixture is agitated for 2–3 hours, while the pH of the solution at 9-10.

The resulting dyestuff, is 1-hydroxy-8-amino-2-(2')-methyl-5'-(1,4,5,6,7,7)-hexachlorobicyclo-(2,2,1)-5-heptene-2,3-dicarboxyimido-benzeneazo-napthalene-3,6-disulphonate.

The dyestuff is filtered-off and dried. The resulting dyestuff comprises a dark-gray powder dyeing an all-wool fabric to a violet colour. The yield of the desired product is 80% of the theoretical value.

The thus-prepared dyestuff is employed for dyeing of specimens of an all-wool felt fabric with a mass of 450 g/m², at the liquor-to-goods ratio of 40:1, the dyeing bath has the following composition:
azodyestuff . . . 3–5% by weight of the fabric
Glauber's salt . . . 10% by weight of the fabric
acetic acid, 30% . . . 5% by weight of the fabric
sulphuric acid . . . to pH=2.

To a solution containing the dyestuff, Glauber's salt and acetic acid the fabric is immersed at the temperature of 30° C. for 45–50 minutes. Then the solution temperature is increased to the boiling point and kept at reflux for 50–60 minutes. Then the dyeing solution temperature is lowered to 70°–80° C. and sulfuric acid is added to pH of 2 and dyeing is continued for additional 15–20 minutes at reflux. Thereafter, the solution is cooled, the dyed fabric is rinsed with water and dried. The data shown in the examples relate to the dyestuff concentration of 5% by weight of the fabric.

The resulting dyed specimen is tested for flame-resistance. The testing method consists in the determination of the burning time, glowing time and maximum length of the carbonized area after the removal of the inflammation source in the vertical testing method. The specimens are also tested for fungicidal resistance. The testing method resides in keeping of the articles infected with spores of mold fungi under the conditions optimal for their growth, followed by assessment of fungi-resistance according to the IEC recommendation. For the tests use is made of an aqueous suspension of a mixture of spores of the following species of mold fungi.

1. *Aspergillus niger* (v.Tiegh)
2. *Aspergillus amstelodami* (Moug)
3. *Penicillium cyclopium* (westl)
4. *Penicillium brevicompactum* (Dierckx)
5. *Paecilomyces varioti* (Bain)
6. *Stachybotrys atra* (Corda)
7. *Chactomium globosum* (kunze)
8. *Aspergillus flavus* (ziuk)
9. *Aspergillus veszicoloz* (Tierab)
10. *Trichoderma lignorum* (Hazz)

The flame-resistance of the dyed specimen of Example 1 at the time of contact with the open fire of 12 seconds is equal to: residual burning—1 sec.; residual glowing —0 sec. height of the carbonized area—20 mm, weight loss—1.23%. The resistance against the action of mold fungi is 0—1 point. Under the same testing conditions the undyed specimen shows the following results: residual burning 54 seconds, residual glowing—0 seconds, height of the carbonized area is 170 mm, weight loss—28%. The resistance against the effect of mold fungi—4 points.

EXAMPLE 2

(a) From 259.7 g of chlorendic anhydride in 1,300 ml of toluene and 77 g of 4-aminophenol there are obtained, under the conditions similar to those of Example 1(a), 300 g of a colourous crystalline product, i.e. N-(4'-hydroxyphenyl)-1,4,5,6,7,7-hexachlorobicyclo-(2,2,1)-5-heptene-2,3-dicarboxyimide melting at 297°–302° C. The yield of the product is 89%, purity 85%. The product purity is determined by the thin-layer chromatography method. The structure of the purified samples of the compound is supported by the data of IR-spectroscopy and NRM of $^{13}C$.

(b) 0.87 g of 4-aminobenzenesulphonic acid is suspended in 10 ml of water, added with 0.3 g to a full dissolution and then, upon cooling and stirring, there is added 1.0 ml of a concentrated hydrochloric acid. After cooling to a temperature of from 0° to 5° C. a solution of 0.36 g of sodium nitrite in 3 ml of water is added thereto.

The resulting suspension of the diazo compound is gradually added to a solution of 2.3 g of N-(4-hydroxyphenyl)-1,4,5,6,7,7-hexachlorobicyclo-(2,2,1)-5-heptene-dicarboxyimidoazobenzene-4'-sulphonate which is filtered-off and dried. The resulting dyestuff comprises a brown powder which dyes a wood fabric to a yellow colour. The yield of the product is 60% of the theoretical value. The dyeing conditions and the procedure for testing for flame-resistance and fungi-resistance are the same as in the foregoing Example 1(b). The flame-resistance of the dyed specimen (at the time of contact with open flame of 12 seconds) is as follows: residual burning—0 seconds; residual glowing—0 seconds; height of the carbonized area—15 mm; weight loss—0.99%. Resistance against the effect of mold fungi is 0-1 points. Under the same testing conditions the original undyed specimen shows the following results: residual burning—54 seconds; residual glowing—0 seconds; height of the carbonized area—170 mm; weight loss—28%. The resistance against mold fungi is 4 points.

EXAMPLE 3

1.84 g of 2-hydroxynaphthalene-3,6-disulphonic acid are dissolved in 20 ml of water added with 1.4 g of soda. At a temperature of 5° C. for 20 minutes under stirring there is added a suspension of a diazo compound produced from N-(4'-methyl-5'-aminophenyl)-1,4,5,6,7,7-hexachlorobicyclo-(2,2,1)-5-heptene-2,3-dicarboxyimide following the procedure described in Example 1(b) hereinbefore. The reaction mixture is stirred for 3 hours. Following a procedure similar to that of Example 1(b), the dyestuff is recovered which comprises disodium 2-hydroxy-1-(2'-methyl-5'-(1,4,5,6,7,7-hexachloro)-bicyclo(2,2,1)-5-heptene-2,3-dicarboxyimide)-benzeneazonaphthalene-3,6-disulphonate; the product yield if 80% of the theoretical.

The resulting dyestuff comprises a brick-red powder which dyes an all-wood fabric to red colour. The conditions of dyeing and the procedure of testing for flameresistance and fungi-resistance are similar to those described in Example 1(b).

The flame-resistance of the dyed specimen at the time of contact with open fire of 12 seconds is as follows: the residual burning—1 second; residual glowing 0 seconds; the height of the carbonized area 24 mm, the weight loss is 2.4%. The resistance against the effect of mold fungi is 1-2 points. Under the same testing conditions the undyed starting specimen has following results: the residual burning— 54 seconds; residual glowing—0 seconds; the height of the carbonized area—170 mm, the weight loss—28%. The resistance against the effect of mold fungi is 4 points.

EXAMPLE 4

1.51 g of 7,7'-ureylenedi-2,5-hydroxy-naphthalenesulphonic acid (based on a 100% acid) is dissolved in 200 ml of water containing 2.3 g of soda ash. The resulting solution is filtered-off and added, under stirring for 30 minutes at a temperature of 10° C., with a suspension of the diazo compound prepared as in Example 1(b). Stirring is continued for two additional hours, while maintaining pH=9 by the addition of the solution of soda. Thereafter, the dyestuff is precipitated by the addition of 11 g of common salt at a temperature of 40° C. The product, i.e. disodium 7,7'-ureylene-2-5,5'-hydroxy-6,6')2'-methyl-5'-(1,3,5,6,7,7-hexachlorobicyclo-(2,2,1)-5-heptene-2,3-dicarboxyimide)-benzeneazonaphthalenesulphonic acid, is filtered-off and dried; the yield is 51.8% of the theoretical. The dyestuff dyes an all-wood fabric to a brick-red colour. The conditions of dyeing and testing procedure for flame resistance and fungi-resistance are similar to those described in Example 1(b) hereinbefore.

The flame-resistance of the dyed sample at the time of contact with open flame of 12 seconds is as follows: residual burning—2 seconds, residual glowing—0 seconds; the height of the carbonized area—10 mm; weight loss—0.27%. The resistance against the effect of mold fungi is 1-2 points. Under the same testing conditions the initial undyed specimen shows the following results: residual burning—54 seconds, residual glowing—0 seconds; the height of the carbonized area—170 mm, weight loss—28%. The resistance against the effect of mold fungi is 4 points.

The dyed fabric has the following characteristics of the dyeing fastness (points) to: dry rubbing 3-4, wet rubbing 4-5, distilled water—4/3/3, dry cleaning—3-4/4/4.

EXAMPLE 5

0.87 g 2,2'-benzidinesulphonic acid is distilled in 10 ml of water with the addition of 0.2 g of caustic soda upon heating to a temperature of 60° C. The reaction medium is slightly alkaline. Then 0.35 g of sodium nitrite in 1.5 ml of water is added upon cooling to a temperature of from 40° to 50° C. The resulting solution is poured, under stirring for 10 minutes, to 1.66 g of a solution of a 27.5% hydrochloric acid in 10 ml of water at a temperature of from 0° to 2° C. Then the mixture is kept for one hour at a temperature of from 20° to 25° C.; the resulting suspension of the diazo compound is added, at a temperature of 5° C. for 30 minutes, to a solution of 2.3 g of N-(4'-hydroxyphenyl)-1,4,5,6,7,7-hexachloro-bicyclo-(2,2,1)-5-heptene-2,3-dicarboxyimide (based on the 100% product) in 30 ml of water containing 0.22 g of caustic soda and 0.40 g of soda ash. Stirring of the reaction mass is continued for 2-3 hours, while maintaining pH of the solution at 9-10 by the addition of a solution of soda. The dyestuff is recovered by adding common salt; the product comprises disodium 4,4'-bis-[2'-hydroxy5'-(1,4,5,6,7,7-hexachlorobicyclo-(2,2,1)-5-heptene-2,3-dicarboxyimide)]-benzenazo-biphenyl-2,2'-disulphonate (the yield is 80% of the theoretical) which dyes an all-wool fabric to a yellow-brown colour. The conditions of dyeing and the procedure of testing for flame-resistance and fungus-resistance are similar to those described in Example 1(b). The flame-resistance of the dyed specimen at the time of contact with open fire of 12 seconds is as follows: residual burning—0 seconds; residual glowing—0 sec; the height of the carbonized area—25 mm, weight loss 3.41%. Under the same testing conditions the initial undyed specimen shows the following results: residual burning—54 sec; residual glowing—0 sec; the height of the carbonized area 170 mm; weight loss—28%. The resistance against the effect of mold fungi is 4 points.

EXAMPLE 6

3.3 g of 2,4,6-tribromoaniline are mixed with 4.7 ml of 35% sulphuric acid, added with 20 ml of water, 1 g of potassium bromide and, at a temperature of from 20° to 25° C. for 3 to 4 hours, there are added 2.3 ml of a 30% solution of sodium nitrite. After the addition of the entire amount of sodium nitrite the reaction mass is stirred for a additional hour and decanted from the undiazotized amine.

The solution of the diazo compound is added to a solution produced from 3.48 g of disodium 2-naphthol-3,6-disulphonic acid in 30 ml of water containing 4 g of soda and stirred for 30 minutes at a temperature of from 20° to 25° C., pH=8.6. The dyestuff precipitate is filtered-off and dried at a temperature of 100° C. The yield of the dry dyestuff is about 60% of the theoretical value. The dyestuff, i.e. disodium 2'-hydroxy-1-(2,4,6-tribromobenzenazo)-naphthalen-3,6-disulphonic acid comprises a cherry-colour powder which dyes a wood fabric to a dark-red colour. The dyeing conditions and the procedure of testing for flame-resistance and fungus-resistance are similar to those described in Example 1(b).

The flame resistance of the dyed specimen at the time of contact with open flame of 12 seconds is as follows: residual burning time—4 seconds; residual glowing time—0 seconds; the height of the carbonized area is 31 mm. The resistance against the effect of mold fungi is 1.1 point. Under the same testing conditions the undyed starting specimen shows the following results: residual burning—54 seconds; residual glowing—0 seconds; the height of the carbonized area—170 mm. The resistance against the effect of mold fungi is 4 points.

The dyed fabric has the following characteristics of fastness of the dyeing, points, to: dry rubbing 3-4, wet rubbing—5.

EXAMPLE 7

9.9 g of 2,4,6-tribromoaniline are diazotised under conditions similar to those described in Example 6 hereinbefore.

The solution of the diazo compound is added to a solution of 10.2 g of sodium 1-amino-8-hydroxynaphthalen-3,6-disulphonic acid and 4 g of soda, pH of the reaction medium being 8.7. The reaction mass is stirred at a temperature of from 20° to 25° C. for a period of from 40 to 60 minutes, while maintaining pH of the medium at 8.4-8.7 by the addition of a 10% solution of soda. The dyestuff is isolated by the addition of common salt. The product is filtered-off and dried. The yield of the dry dyestuff, i.e. disodium 2-hydroxy-8-amino-2-(2',4',6'-tribromobenzenazo)-naphthalene-3,6-disulphonic acid is about 50% of the theoretical value.

The resulting dyestuff is a brown-colour powder which dyes a wood fabric to red colour. The dyeing conditions and the procedure for testing of flame-resistance are similar to those of Example 1(b).

The flame-resistance of the dyed specimen at the time of contact with open fire of 12 seconds is as follows: residual burning 0 seconds; residual glowing—0 seconds; the height of the carbonized area is 20 mm. Under the same testing conditions the initial undyed specimen shows the following results: residual burning—54 seconds; residual glowing 0 seconds, the height of the carbonized area—170 mm.

EXAMPLE 8

16.55 g of 1-amino-2,4-dibromobenzene-5-sulphonic acid are dissolved in 20 ml of water with the addition of caustic soda. The resulting solution is added with 3.1 g of sodium nitrite in the form of a 30% solution. The resulting solution is poured on a mixture of 14 ml of a 29% hydrochloric acid, 20 ml of water and 4 g of potassium bromide. Then to the thus-prepared mass, under stirring, there is added additional 0.35 g of sodium nitrite in the form of a 30% solution (trace of blue colour on starched paper). The suspension of the diazo compound is stirred for an additional 30 minutes and poured to a solution of 12.95 g of sodium 2-hydroxynaphthalen-6-sulphonic acid and 15.4 g of soda in 200 ml of water, pH of the reaction mixture being equal to 9.0. The reaction mass is stirred for additional 30 minutes at a temperature of from 20° to 25° C. The dyestuff is salted out using a common salt (in the amount of 20% by volume) at a temperature of 60° C., cooled to 20° C. and filtered. The dyestuff is dried at a temperature of 100° C. The yield of the thus-prepared dyestuff, i.e. 2-hydroxy-1-(2',4'-dibromo-5'-sulpho)-benzenazonaphthalen-6-sulphonic acid is 73–74% of the theoretical value.

The product is a bright-red colour powder which dyes a wool fabric to an orange-red colour. The dyeing conditions and the procedure of testing for flame-resistance and fungi-resistance are similar to those described in Example 1(b).

The flame-resistance of the dyed specimen at the time of contact with open fire of 12 seconds is as follows: residual burning—0 second; residual glowing—0 seconds; the height of the carbonized area is 36 mm.. The resistance against the effect of mold fungi is 0 point. Under the same testing conditions the initial undyed specimen shows the following results; residual burning 54 seconds; residual glowing—0 seconds, the height of the carbonized area—170 mm. The resistance against the effect of mold fungi is 4 points.

EXAMPLE 9

2.7 g of 1-amino-2,4-dibromobenzen-5-sulphonic acid are subjected to diazotization under conditions similar to those of Example 8 hereinbefore.

The suspension of the diazo compound of 1-amino-2,4-dibromobenzene-5-sulphonic acid is added to a solution of 2.13 g of 1-(4-sulphophenyl)-3-methylpyrazolon-5 and 2 g of soda in 20 ml of water. The reaction mass is stirred for one hour, the pH of the reaction medium by the end of the coupling being 8.5. Then the dyestuff is heated to a temperature of 60° C. and salted out using common salt (at the rate of 25% by volume) cooled, a residue is filtered-off and dried at the temperature of 100° C.

The yield of the dry dyestuff, i.e. disodium 1-(4'-sulphophenyl)-3-methyl-4-(2',4'-dibromo-5'-sulphophenyl)-benzenazopyrazolon-5) is 66% of the theoretical value.

The product is a bright-yellow powder which dyes a wool fabric to yellow colour. The dyeing conditions and the procedure of testing for flame-resistance and fungus-resistance are similar to those described in Example 1(b).

The flame-resistance of the dyed specimen at the time of contact with open fire of 12 seconds is as follows: residual burning is 0 sec; residual glowing—0 sec; the height of the carbonized area—20 mm. The resistance against the effect of mold fungi is 4 points. Under the same testing conditions the initial undyed specimen shows the following results: residual burning—54 seconds; residual glowing—0 seconds; the height of the carbonized area—170 mm.

The dyed fabric has the following characteristics of dyeing fastness, points, to: dry rubbing 4, wet rubbing—5, distilled water—3-4/2/4-4, dry cleaning—5/5/5.

EXAMPLE 10

3.3 g of 1-amino-2,4-dibromobenzene-5-sulphonic acid are diazotized under conditions similar to those of Example 8.

A suspension of the diazo compound of 2,4-dibromometanilic acid is added to a solution of 3.05 g of sodium 1—phenylaminonaphthalen-8-sulphonic acid in 20 ml of water and then hydrochloric acid to a weakly acidic reaction. The reaction mass is stirred for one hour at the pH of the reaction medium of b 4.0. The thus prepared dyestuff is heated to the temperature of 60° C., salted out using common salt (in the amount of 25% by volume), acidified with hydrochloric acid to pH of .16 and filtered.

The yield of the dyestuff, i.e. disodium 1-phenylamino-4-(2',4'-dibromo-5'-sulphobenzenazo)-naphthalene-8-sulphonic acid is 60% of the theoretical value.

The resulting dyestuff is a black powder which dyes a wool fabric to a dark-brown colour. The dyeing conditions and the procedure of testing for flame-resistance are similar to those of Example 1(b).

The flame-resistance of the dyed specimen at the time of contact with open fire of 12 seconds is as follows: residual burning—0 seconds; residual glowing—0 second; the height of the carbonized area—15 mm. Under the same testing conditions the undyed initial speciman has the following characteristics: residual burning—54 seconds; residual glowing—0 seconds, the height of the carbonized area—170 mm.

EXAMPLE 11

2.7 g of 1-amino-2,4-dibromobenzene-5-sulphonic acid are diazotized under conditions similar to those of Example 8.

1.94 g of naphthionic acid are coupled with the diazo compound of 1-amino-2,4-dibromobenzene-5-sulphonic acid under conditions similar to those described in Example 10.

The yield of the dyestuff, i.e. disodium 1-amino-2-(2',4'-dibromo-5'-sulpho-benzena zonaphthalen-4-sulfonic acid is 72% of the theoretical value.

The products is a red powder which dyes an all-wool fabric to a terra-cotta colour. The dyeing conditions and the procedure of testing for flame-resistance are similar to those of Example 1(b).

The flame-resistance of the dyed sample at the time of contact with open fire of 12 seconds is as follows: residual burning is 0 seconds; residual glowing—0 seconds; the height of the carbonized area is 12 mm. Under the same testing conditions the initial undyed specimen shows the following results: residual burning—54 seconds; residual glowing—0 seconds; the height of the carbonized area—170 mm.

The dyed fabric has the following characteristics of the dyeing fastness, points, to: dry rubbing—4, wet rubbing 5, distilled water—3/2/4, dry cleaning—5/5/5.

EXAMPLE 12

4.2 g of 1-amino-2,4,6-tribromobenzene-3-sulphonic acid are dissolved in 40 ml of water, added with 2.5 ml of a 29% hydrochloric acid and 0.69 g of sodium nitrite in the form of a 30% solution. The suspension of the diazo compound is stirred to complete the reaction within 30 minutes.

The suspension of the diazo compound of 1-amino-2,4,6-tribromobenzene-3-sulphonic acid is added to a solution of 3.54 g of disodium 2-hydroxy-naphthalene-3,6-disulphonic acid and 3.3 g of soda in 44 ml of water at a temperature of 20°–22° C. The pH value of the reaction medium at the end of the coupling reaction is 8.8. The reaction mass is stirred for one hour.

The residue of the dyestuff is filtered and dried at a temperature of 100° C.

The yield of the dyestuff, i.e. trisodium 2-hydroxy-1-(2',4',6'-tribromo-3'-sulpho)benzene-naphthalen-3,6-disulphonic acid, is 88% of the theoretical value. The dyestuff is a red powder which dyes a wool fabric to red colour. The dyeing conditions and the procedure of testing for flame-resistance are similar to those described in Example 1(b).

The flame-resistance of the dyed specimen at the time of contact with open flame of 12 seconds is as follows: residual burning—0 sec; residual glowing—0 sec; the height of the carbonized area is 31 mm. Under the same testing conditions the initial undyed specimen has the following results: residual burning—54 seconds; residual glowing—0 seconds; the height of the carbonized area—170 mm.

EXAMPLE 13

4.1 g of 1-amino-2,4,6-tribromobenzene-3-sulphonic acid are diazotized under conditions similar to those described in Example 11.

The suspension of the diazo compound of 1-amino-2,4,6-tribromobenzene-3-sulphonic acid is added to 2.68 g of a solution of 1-(4'-sulphophenyl)-3-methylpyrazolone-5 and 2.5 g of soda in 50 ml of water. The coupling reaction is carried out at a temperature of 20° C. and pH of the reaction medium of 8.2.

The reaction mass is stirred for additional 30 minutes after a addition of all the components, then heated to the temerature of 60° C., added with 37 g of common salt, acidified with hydrochloric acid to an acidic reaction of the medium defined by test kongo paper. The suspension of the dyestuff is stirred for one hour after the addition of common salt (the dyestuff suspension gradually cools to a temperature of from 20° to 25° C.), filtered and dried at a temperature of 100° C. The yield of the dyestuff, i.e. disodium 1-(4'-sulphophenyl)-3-methyl-4-(2,4,6-tribromo-3'-sulpho)-benzeneazopyrazolone-5 is equal to 62% of the theoretical value. The product is a yellow powder which dyes a wool fabric to orange colour. The dyeing conditions, the testing procedure for flame-resistance and fungus-resistance are as in Example 1(b).

The flame-resistance of the dyed specimen at the time of contact with open fire of 12 seconds is as follows: residual burning is 0 seconds; residual glowing is 0 seconds; the height of the carbonized area is 23 mm. The resistance against the effect of mold fungi is 0–1 point. Under the same testing conditions the initial undyed specimen has the following characterisitics: residual burning—54 seconds, residual glowing—0 seconds; the height of the carbonized area is 170 mm. The resistance against the effect of mold fungi is 4 points.

EXAMPLE 14

4.1 g of 1-amino-2,4,6-tribromobenzene-3-sulphonic acid are diazotized under the conditions described in Example 11 hereinbefore.

3.14 g of 1-phenylaminonaphthalene-8-sulphonic acid are coupled with the diazo compound of 1-amino-2,4,6-tribromobenzene-3-sulphonic acid in the presence of sodium acetate under conditions similar to those of Example 10.

The yield of the dyestuff, i.e. disodium 1-phenylamino-4-(2',4',6'-tribromo-3'-sulpho)/-benzeneazonaphthalene-8-sulphonic acid is equal to 88% of the theoretical value. The product is a black powder which dyes a wool fabric to bordeaux colour. The dyeing conditions and the procedure of testing for the flame-resistance are similar to those of Example 1(b).

The flame-resistance of the dyed specimen at the time of contact of 12 seconds is as follows: residual burning is 0 seconds; residual glowing is 0 seconds, the height of the carbonized area is 22 mm. Under the same testing conditions the initial undyed specimen has the following characteristics: residual burning time—54 seconds, residual glowing—0 seconds; the height of the carbonized area is 170 mm.

INDUSTRIAL APPLICABILITY

The dyestuffs according to the present invention are useful in finishing of protein fibrous materials adapted for use in ship-building, automobile and aviation industries, for the manufacture of overalls for metallurgists and racers, for decorative-upholstering materials employed in household applications.

We claim:

1. Halogenated azo dyestuff possessing flame-resistant and antimicrobial properties and being of the formula:

wherein

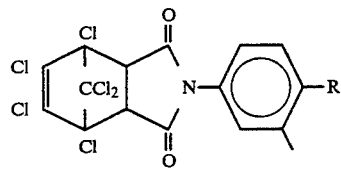

$R = -CH_3, -OH$; and

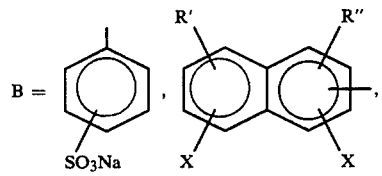

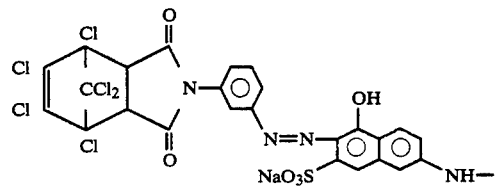

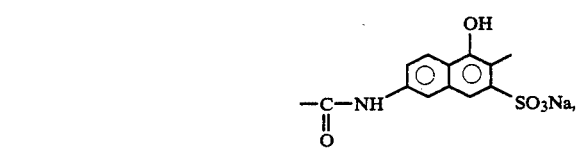

-continued

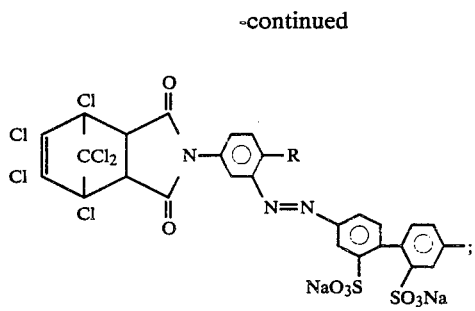

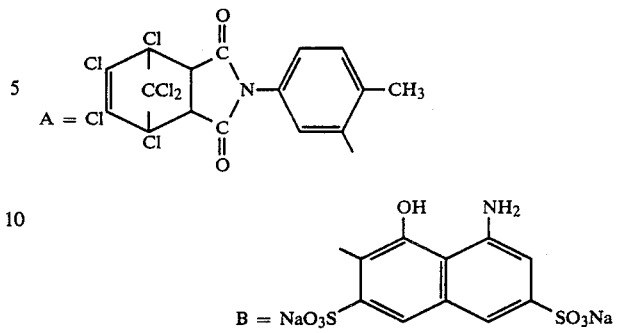

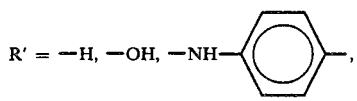

R'' = —H, —NH$_2$, —SO$_3$Na;

X = —H, —SO$_3$Na.

2. Azo dyestuff according to claim 1, wherein:

3. The halogenated azo dyestuff which is N-(4'-hydroxyphenyl)-1,4,5,6,7,7-hexachlorobicyclo-(2,2,1)-5-Heptenedicarboxyimidoazobenzene-4'-sulphonate.

4. The halogenated azo dyestuff which is disodium 2-hydroxy-1-(2'-methyl-5'-(1,4,5,6,7,7-hexachloro)-bicyclo-(2,2,1)-5-heptene-2,3-dicarboxyimide)-benzeneazonaphthalene-3,6-disulphonate.

5. The halogenated azo dyestuff which is disodium 7,7'-ureylene-2-5,5'-hydroxy-6,6'(2'-methyl-5'-(1,3,5,6,7,7'-hexachlorobicyclo-(2,2,1)-5-heptene-2,3-dicarboxyimide)-benzeneazonaphthalenesulphonic acid.

6. The halogenated azo dyestuff which is disodium 4,4'-bis-(2'-hydroxy-5'-(1,4,5,6,7,7'-hexachlorobicyclo-(2,2,1)-5-heptene-2,3-dicarboxyimide)-benzenazobiphenyl-2,2'-disulphonate.

* * * * *